UNITED STATES PATENT OFFICE.

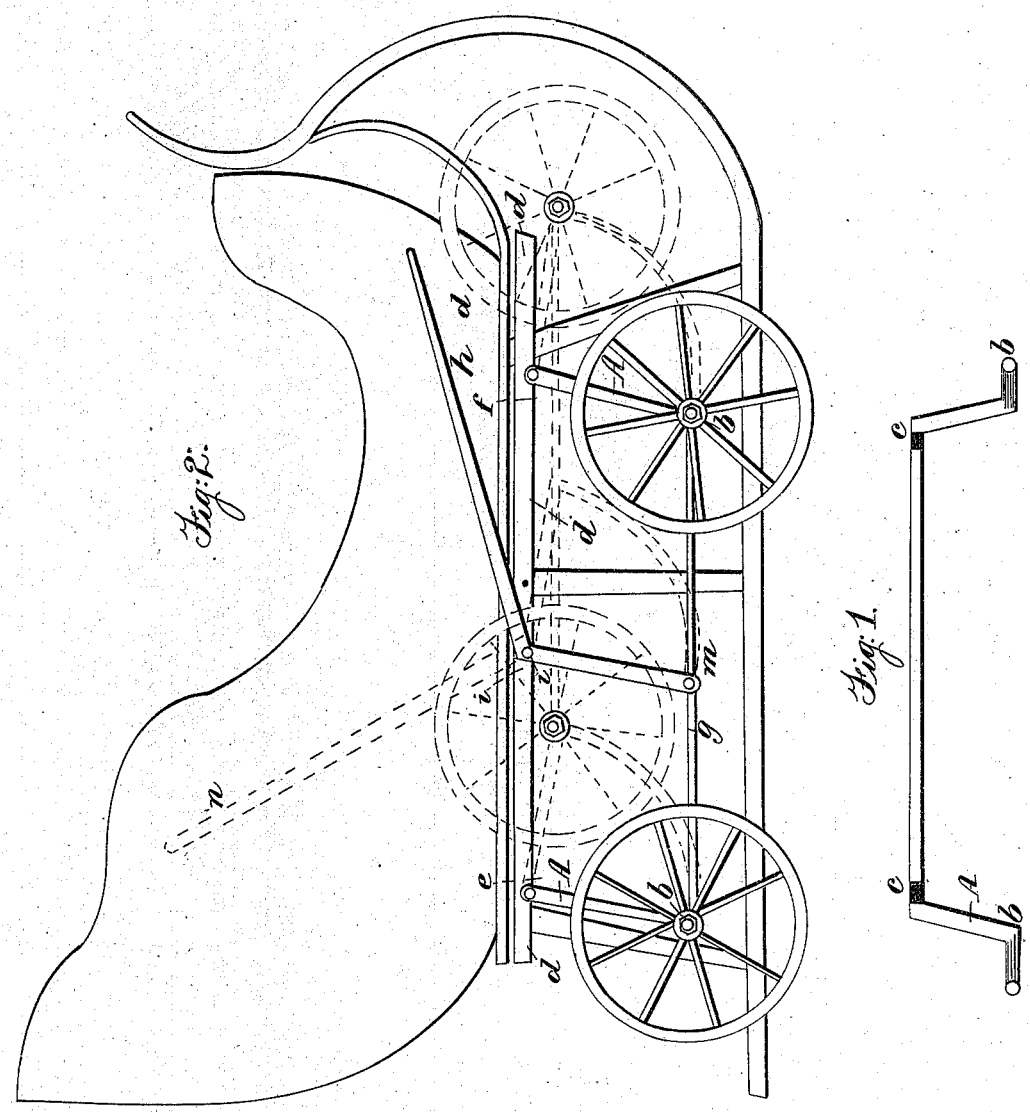

DAVID S. BARBER, ALMON THOMPSON, AND DE ALGEROY THOMPSON, OF PITTSFIELD, VERMONT.

IMPROVEMENT IN SLEIGHS.

Specification forming part of Letters Patent No. 12,850, dated May 15, 1855.

*To all whom it may concern:*

Be it known that we, DAVID S. BARBER, ALMON THOMPSON, and DE ALGEROY THOMPSON, of Pittsfield, in the county of Rutland and State of Vermont, have invented a new and improved mode of constructing a sleigh by means of attaching four wheels on which the sleigh can instantaneously be made to run; and we do hereby declare that the following is a full and exact description thereof, reference being had to the accompanying drawing, and to the letters of reference marked thereon.

The nature of our invention consists in providing the running-gear of any common sleigh or sled with four wheels on which the sleigh may instantly be made to run, which is done by means of two crank or angle-shaped axles operated by a connecting rod and lever, so that the wheels may be thrown below the runners of the sleigh, so as to run on the ground, or may be thrown or raised up, so that the sleigh will run on its runners. Thus it may be made to operate either as a sleigh or wagon.

To enable others skilled in the art to make and use our invention, we will proceed to describe its construction and operation.

We construct our attachment so as to apply to sleighs constructed in any of the known forms, which consists of four wheels and other appendages, so that in case a man in traveling with his sleigh comes to bare ground he can by means of a lever adjust the wheels so that the sleigh will be made to run substantially on wheels.

We construct two axles A in the shown form of No. 1 in the accompanying drawing. On the two shafts or bearings $b\ b$ of each axle we place the wheels. Then we fasten two pieces of timber $d$—one on each side of the sleigh—to the posts near the top, and then fasten the axle A to the pieces $d\ d$ at the bearings $c\ c$, one axle at the rear end of the sleigh at $e$ and the other at the fore end at $f$. The full lines show when running on wheels. The dotted lines show the position of the wheels when running on the runners. We connect the ends of the axles A on one side of the sleigh with the rod $g$ for the purpose of steadying them and for moving the wheels to the position shown by the dotted lines. Then we attach the lever $h$ to the timber $d$ at its angle shown at $i$, attaching the short arm to the rod $g$ at $m$, the long arm of the lever forming a handle by which we adjust the wheels.

When the sleigh is running on the wheels, to shift it onto the runners take hold of the lever at $h$ and turn it back to the point $n$, which by means of the connecting-rod $g$ moves the wheels up to the position shown by the dotted lines, and to shift it from the runners to the wheels take hold of the lever at $n$ and move it to the point $h$. Said lever may be fastened at either point by means of a little strap at the points $h$ or $n$.

What we claim as our invention, and desire to secure by Letters Patent, is—

The attachment of wheels to a sleigh to operate, as aforesaid, in the manner herein substantially described.

DAVID S. BARBER.  [L. S.]
    ALMON THOMPSON.  [L. S.]
    DE ALGEROY THOMPSON.  [L. S.]

Witnesses:
 ALBERT VOSE,
 CROMWELL THOMPSON.